March 6, 1934. B. E. HOUSE 1,950,243
SHAFT BEARING
Filed Dec. 8, 1930
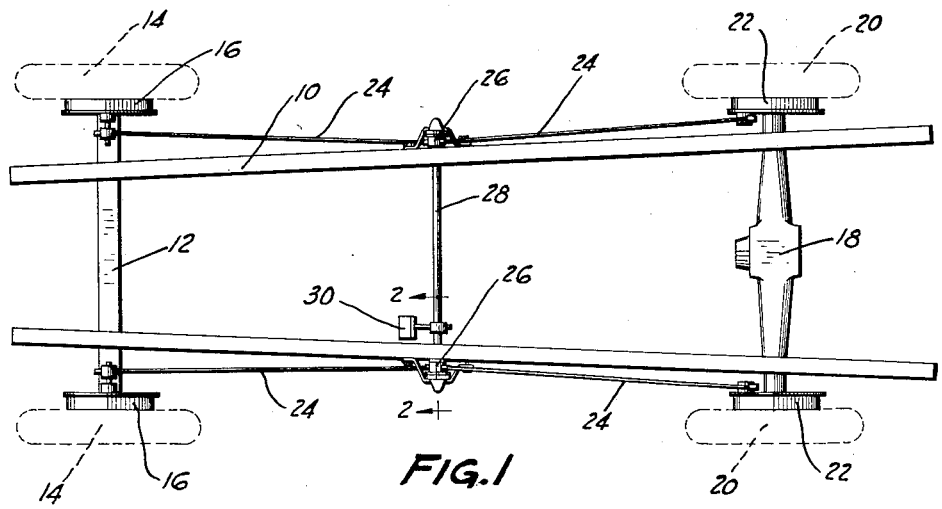
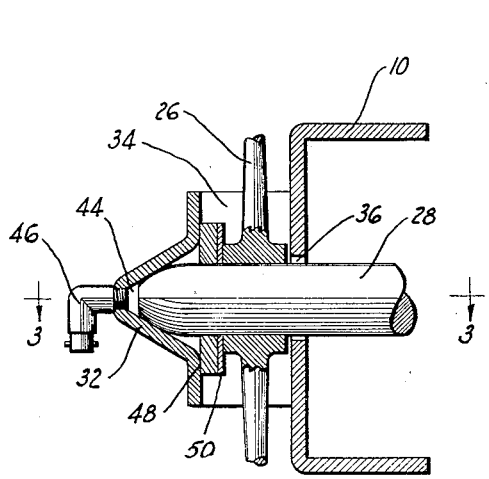
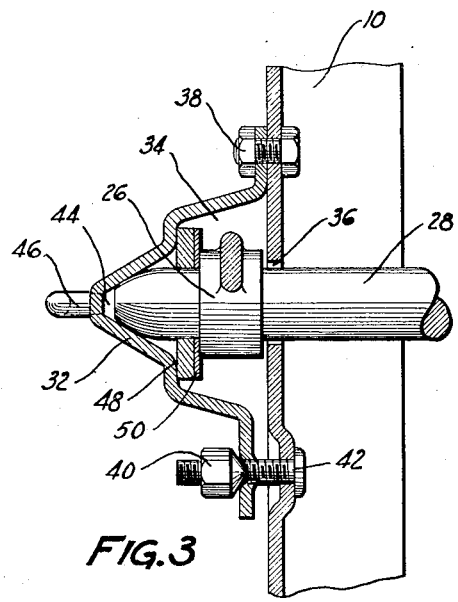
FIG.1
FIG.2
FIG.3
INVENTOR.
BRYAN E. HOUSE
BY
ATTORNEY Patented Mar. 6, 1934

1,950,243

UNITED STATES PATENT OFFICE 1,950,243

SHAFT BEARING

Bryan E. House, South Bend, Ind., assignor to Bendix Aviation Corporation, South Bend, Ind., a corporation of Delaware Application December 8, 1930, Serial No. 500,742

3 Claims. (Cl. 308—163)

This invention relates to bearings for brake operating shafts and the like and is illustrated as embodied in a novel bearing carried by one side member of an automobile chassis frame and supporting one end of a transverse brake operating shaft.

An object of the invention is to provide simple means for lubricating the shaft bearing, for example by forming the bearing member with a socket preferably of conical form, in which the end of the shaft is journaled and the base of which socket, together with the end of the shaft, forms a chamber for lubricant for the shaft. Preferably the shaft is provided with a felt washer or the like sealing the open side of the socket to prevent loss of lubricant, and in one desirable arrangement I find that the felt washer or its equivalent can be held without providing additional parts by means of a brake operating lever arranged on the shaft, preferably between the side chassis frame member and the felt washer.

Another feature of the invention relates to the supporting of the end of the shaft by means of a resilient bearing member having a socket for receiving the shaft end and aligned with an opening in the side chassis frame member through which the shaft passes, the bearing member preferably being arranged to be drawn up by means such as a draw bolt to hold the socket in yielding engagement with the end of the shaft.

The above and other objects and features of the invention, including various novel and desirable details of construction, will be apparent from the following description of one illustrative embodiment shown in the accompanying drawing, in which:

Figure 1 is a diagrammatic top plan view of an automobile chassis showing the arrangement of the above-described transverse shaft;

Figure 2 is a section on the line 2—2 showing the novel shaft bearing member in vertical section and showing the arrangement of the parts at the end of the shaft; and Figure 3 is a section on the line 3—3 of Figure 2 showing the same parts in horizontal section.

The particular automobile chassis shown, and which in itself forms no part of my invention, includes a chassis frame 10 of any desired form supported by the usual springs on the front axle 12 carried by road wheels 14 having brakes 16 and on a rear axle 18 supported by road wheels 20 having brakes 22. The brakes are applied by means of rods or cables or the like 24 connected to double-ended levers 26 fixedly secured in any desired manner on the ends of a transverse shaft 28 operated by means such as a brake pedal 30. The present invention relates to the means for supporting the shaft 28.

I prefer to support each end of the shaft in a conical socket 32 drawn or pressed in a stamped steel bearing member 34. The socket 32 receives the rounded but generally conical end of the shaft 28 and is arranged in alignment with an opening 36 in the side member of frame 10 through which the shaft 28 passes. The bearing member 34, being of sheet steel, is resilient and the socket 32 is preferably yieldingly urged against the end of the shaft by fastening one end of the bearing member rigidly to the frame 10 by means such as a bolt 38, while the opposite end is drawn toward the frame 10 by means such as a spherical base nut 40 threaded on a draw bolt 42 carried by the frame, the nut having its base seated in a spherical socket in the end of the bearing member 34.

It will be noted that between the base of the socket 32 and the end of the shaft 28 there is left a chamber 44 for lubricant and I prefer to provide means such as a fitting or nipple 46 for introducing lubricant into this chamber. In order to prevent the loss of lubricant, the open side of the socket 32 is preferably sealed by means such as a felt washer or the like 48 shown as being backed up by a steel washer 50 seated against the central hub of the lever 26 which is fixed on shaft 28. There is a slight clearance between the hub of the lever 26 and the adjacent side of the chassis frame 10 so that the tightening of the nut 40 serves to compress the felt washer 48 until the socket 32 seats firmly against the end of the shaft 28 and then, since the nuts 40 at both ends of the frame 28 are tightened, the bearing members 34 on opposite sides of the frame serve to hold the shaft yieldingly clamped axially between them.

While one illustrative embodiment has been described in detail, it is not my intention to limit the scope of the invention to that particular embodiment or otherewise than by the terms of the appended claims.

I claim:

1. A frame member having an opening and having secured thereto a bearing member with a socket alined with the opening, in combination with a shaft passing through the opening, and having its end journaled in the socket and carrying a washer part engaging and sealing the open side of the socket, together with a lever mounted on the shaft between the frame member and the washer part and holding the washer part.

2. A frame member having an opening and having secured thereto a bearing member with a socket alined with the opening, in combination with a shaft passing through the opening and having its end journaled in the socket, a washer surrounding said shaft and forming a closure for the socket, together with a lever mounted on the shaft between the frame member and the bearing member and contacting with said washer for maintaining it in position.

3. In combination, a frame member, a bearing member associated therewith and formed with a socket, a shaft having one end journaled in the socket, a washer carried by the shaft and engaging and sealing the open side of said socket, and a lever mounted on the shaft and contacting on one side with the washer and on the other side with the frame member, whereby the washer is maintained against the socket by the lever and thus prevents the escape of lubricant from the socket.

BRYAN E. HOUSE.